Oct. 14, 1952 — R. J. FRANCIS — 2,614,058

METHODS OF FORMING REINFORCED HOLLOW PLASTIC ARTICLES

Filed June 3, 1948

INVENTOR.
*Richard J. Francis.*
BY
Corbett, Mahoney & Miller
ATTORNEYS

Oct. 14, 1952 R. J. FRANCIS 2,614,058
METHODS OF FORMING REINFORCED HOLLOW PLASTIC ARTICLES
Filed June 3, 1948 3 Sheets-Sheet 2

INVENTOR.
Richard J. Francis.
BY Corbett, Mahoney & Miller
ATTORNEYS

Oct. 14, 1952 — R. J. FRANCIS — 2,614,058
METHODS OF FORMING REINFORCED HOLLOW PLASTIC ARTICLES
Filed June 3, 1948 — 3 Sheets-Sheet 3

INVENTOR.
Richard J. Francis.
BY Corbett, Mahoney + Miller
ATTORNEYS

Patented Oct. 14, 1952

2,614,058

UNITED STATES PATENT OFFICE 2,614,058

METHODS OF FORMING REINFORCED HOLLOW PLASTIC ARTICLES

Richard J. Francis, Granville, Ohio

Application June 3, 1948, Serial No. 30,934

11 Claims. (Cl. 154—83)

My invention relates to methods of forming reinforced hollow plastic articles. More specifically, it relates to reinforced plastic tubing and method of making the same, although it is not limited to tubing.

Reinforced plastic tubing is now being made and used. However, this prior art plastic tubing has certain undesirable characteristics. Prior art plastic tubing does not have sufficient structural strength for all purposes and quite often is porous which makes it unsuitable for certain uses such as for conducting fluids and especially fluids under pressure. The most common type of reinforced plastic tubing now in use is made from a suitable resin, such as a polyester resin, reinforced with a cloth formed of glass yarn. The resin is applied to the cloth by first passing the cloth through the uncured resin in liquid form. To produce the tubing, the cloth is convolutely wound on a suitable mandrel in overlapping layers to build up a wall structure. After the tubing is formed in this manner, it is subjected to elevated temperatures which cure the resin. In winding the plastic-coated cloth on the mandrel, air is invariably trapped in the reinforcement as it is built up into a wall structure. This results in the formation of cells or holes in the wall during the forming and curing operations, thereby decreasing the strength of the final tubing and sometimes making it porous, so that the tubing will not be suitable for all uses. Also, because the cloth type reinforcement is used, it is well oriented into definite layers and is, therefore, susceptible to delamination.

Cotton fabric and paper have been used for years to reinforce tubes of phenolic resins. However, here again the reinforcement is first treated with the resin after which the reinforcement is convolutely wound on a mandrel to form a laminated wall structure. This structure has all of the disadvantages pointed out above in connection with the glass cloth reinforced tubing.

One of the objects of my invention is to provide reinforced plastic tubing which is so formed that it will be non-porous and of high structural strength.

Another object of my invention is to provide reinforced plastic tubing wherein the wall of the tubing is composed of reinforcing filaments which are embedded in the plastic material in such a manner that both the inside and outside of the tubing has a relatively smooth and continuous plastic surface which is non-porous.

Another object of my invention is to provide plastic tubing of the type indicated in the preceding paragraph of such a nature that the reinforcement contained within the plastic material is not oriented into definite layers which tend to separate, but, on the other hand, is arranged in an interwoven pattern so that the various filaments are separated from each other in all directions by the plastic material and there are not definite layers which tend to separate.

Still another object of my invention is to provide a simple, effective and economical method for making reinforced plastic tubing of the type indicated above, such method being adaptable to large scale commercial production of the tubing.

A further object of my invention is to provide a method of forming reinforced plastic tubing which is of such a nature that the reinforcement may be incorporated with the resin in the built-up wall structure in such a manner as to preclude the trapping of air therein and which, consequently, results in the production of tubing free of porosity which promotes leakage and stress concentrations.

An additional object of my invention is to provide a method of forming reinforced plastic tubing wherein the reinforcement in the form of filaments is incorporated with the resin in a built-up wall structure in the form of an interweaving pattern or mat of random fiber orientation thereby resulting in the elimination of layer orientation and, consequently, eliminating the tendency towards delamination.

Various other objects will be apparent hereinafter.

The tubing or other hollow article of my invention, as previously indicated, is composed of plastic reinforced with filaments of suitable material. I have found that polyester resins are the most suitable for use in making my article and I prefer to use glass yarns as the filament. However, although I prefer to use unsaturated polyester resins, I may employ other polymerizing resins, such as polyethylene or the copolymer of vinylidine chloride and vinyl chloride. Instead of using glass yarns as the filaments, I may employ cotton yarn, wool yarn, thin metal wire, or any other suitable filament material. However, this filament material should be sufficiently pliable that it can be traversed on a mandrel in an interweaving pattern or be formed into a mat composed of spaced loosely-related fibers.

The tubing of my invention is produced by a method which in general comprises building up gradually the tubing wall by using a suitable reinforcement and resin of the type indicated. As the wall of the tubing is being built-up, the uncured liquid resin is forced through and around the reinforcement material, forcing air towards a surface of the tubing, until sufficient wall structure has been built-up, at which time all of the air will have been removed or will appear as bubbles on the tubing surface which can then be removed by breaking so as to eliminate substantially all air.

In producing the tubing according to one form of my process, a mandrel is selected and is completely covered with a coating of the resin material to be used in forming the article. This material is applied to the mandrel in the form of an uncured liquid which will adhere to the mandrel in the form of a tacky coating or film which will completely cover the mandrel in considerable thickness. The filament reinforcing material is then applied to the mandrel in the form of a fine strand or band of fibers or in the form of a loose mat of fibers which is wound on the plastic-coated mandrel. If the reinforcing is applied as a fine strand or band, it is wound helically on the mandrel, the mandrel being traversed a number of times but a sufficient lead being used to ensure that the adjacent convolutions of strand or band are spaced from each other. On the other hand, if the reinforcing is applied as a loosely-woven mat of fibers, it is convolutely wound on the mandrel. In either case, the individual filaments of the reinforcing material are spaced apart sufficiently to permit the plastic material, which coats the mandrel, to seep or ooze out through the interstices between the filaments, forcing all air ahead of it and eventually emerging to the outer surface of the wall being built-up and forming a continuous coating of resin on such outer surface. It will be apparent that as the reinforcing material is wound on the mandrel and the plastic is squeezed through the interstices, all air will be forced ahead of the resin material. Thus, a wall structure will be built-up which will be non-porous and free of air cells.

After the wall structure of the tubing or other hollow article is built-up in the manner indicated above, the mandrel may or may not be removed. In some instances, it may be desirable to use a hollow mandrel which will not be removed and will serve as a reinforcing liner. However, if the built-up tubing is removed from the mandrel, it will be apparent that there will also be a continuous coating of resin on the inner surface of the tubing.

According to another form of my process the tubing may be built up by a centrifugal method. With this method, a preform of filaments of suitable reinforcing material is first produced. This preform will be of suitable shape, for example, tubular. The preform is then placed in a suitable mold, for example, a metal tube which is heated. Then the mold is rotated at moderately high speeds and the resin is supplied to the interior thereof. Centrifugal force created by rotation of the mold will force the uncured resin outwardly through and around the strands of the reinforcement preform. This will cause the air to be forced or worked inwardly to the inner surface of the tube being built-up where it will be eliminated. The tubing is then removed from the mold and will have an extremely smooth outer surface and a relatively smooth inner surface, both comprising continuous coatings of resin.

The tubing built-up by either form of my method is next subjected to a suitable drying or heating operation which causes curing of the resin. The resulting article will be composed of a suitable wall thickness of completely cured resin having filaments of suitable reinforcement embedded therein and arranged either in an interwoven pattern of strands of reinforcement or as a mat composed of random oriented fibers. In either case, the filaments will be separated from each other in all directions with cured resin material being disposed therebetween and producing an adherent mass. The mandrel-winding method is preferred for forming tubing with an extremely smooth inner surface while the centrifugal method is preferred for forming tubes with an extremely smooth outer surface.

In the accompanying drawings, I have illustrated diagrammatically the manner in which my method may be performed and I have also illustrated the resulting products of such method. In these drawings.

Figure 1:
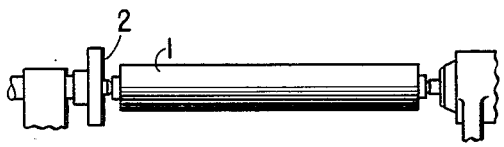
Figure 1 illustrates a mandrel upon which tubing may be formed according to my invention, the mandrel being mounted for rotation.

I have illustrated in the drawings several ways in which my process may be performed. Figures 1 to 24, inclusive, illustrate the mandrel-winding form of my method while Figures 25 to 33, inclusive, illustrate the centrifugal form of my method.

In Figure 1, I have illustrated a mandrel 1 which is mounted for rotation on a suitable spindle lathe 2 or other suitable apparatus for rotating the mandrel. The mandrel 1 may be either hollow or solid and may be formed of metal or other suitable material which will not adhere to the built-up reinforced plastic wall which will be formed thereon subsequently or which may be lubricated to prevent such adherence.

Figure 2:
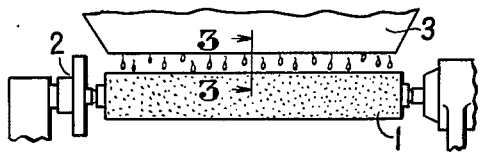
Figure 2 is a view showing how the uncured resin in liquid form may be applied to the mandrel.
Figure 3:
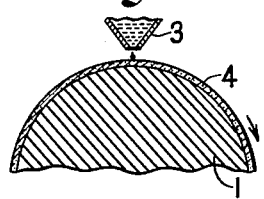
Figure 3 is a transverse section taken along line 3—3 of Figure 2 through the mandrel showing the coating or resin carried thereby.

As illustrated in Figure 2, the uncured resin, in liquid form, is applied to the surface of the mandrel. This may be accomplished in any suitable way but I illustrate a trough 3 with an elongated discharge slot which extends substantially the full length of the mandrel. This trough will contain the uncured resin and it will be allowed to discharge slowly onto the mandrel while the mandrel is rotated. As indicated in Figure 3, a substantially continuous thick coating 4 of the resin will be applied to the mandrel 1. This coating will be relatively viscous and tacky so that it will adhere to the mandrel but still will be flowable so that it can be forced outwardly between the reinforcement as it is subsequently applied to the mandrel.

Figure 4:
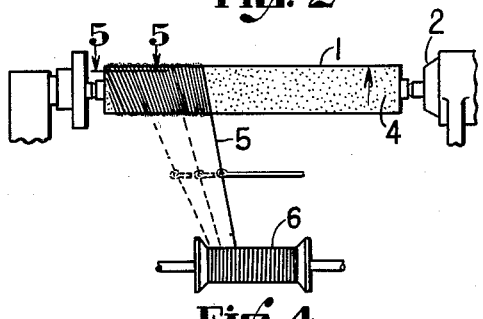
Figure 4 is a view showing how the reinforcing strand is spirally wound on the rotating mandrel.

The next step is to apply the reinforcement to the resin-coated mandrel and this step is illustrated in Figure 4. As previously indicated, the reinforcement may be any suitable material in the form of a strand or narrow band. In Figure 4, the reinforcement is illustrated as a strand 5 which is unwound from a spool 6. The strand 5 is helically wound on the resin-coated mandrel, the spool 6 being suitably moved axially of the mandrel so that the mandrel will be traversed several times in winding the strand thereon. In winding the strand on the mandrel, any suitable selected "lead" may be used in obtaining the desired angular relationship of the reinforcing strand relative to the axis of the mandrel. The lead or angular relationship employed will depend somewhat upon the purpose for which the tube is to be used. Obviously, the lead may be such that maximum bursting strength or maximum bending strength is obtained in the tube.

The resin is initially applied to the mandrel preferably in a thickness of about $\frac{1}{16}$ inch. In winding the strand 5 on the mandrel, the mandrel may be rotated at such a speed that the resin will not be thrown off to any considerable extent. This will depend somewhat upon the diameter of the mandrel and the viscosity of the resin.

Figure 5:
Figure 5 is a longitudinal sectional view taken through the mandrel of Figure 4 along line 5—5 illustrating how the resin is forced out between the convolutions of reinforcement as the reinforcement is wound on the mandrel.

The strand 5 may be composed of filaments to which have been given little or no twist, or it may be a band or strip of strands to each of which have been added little or no twist. As this is wound on the resin-covered mandrel, resin forces between the filaments of the strands, forcing air ahead of it. Of course, the resin will also be forced outwardly around the strands. As previously indicated, the viscosity of the resin should be such as to permit this. During the winding of the strand 5 on the mandrel, additional resin is preferably added, for example by the trough 3, to keep the thickness of the resin outside the reinforcement substantially the same as the thickness of the original coating. For example, it is preferable to keep a coating of about $\frac{1}{16}$ inch of resin outside the reinforcement. As indicated in Figure 5, as the strand reinforcement 5 is wound on the mandrel 1, the flowable resin is forced outwardly through the strand and between the adjacent convolutions of the reinforcement. As the strand is wound on the mandrel and becomes embedded in the resin coating, the air in the resin is forced ahead of the strand and outwardly through the resin. Consequently, any air bubbles will be formed at the extreme outer surface of the reinforced coating and will subsequently burst or be wiped off.

Figure 6:
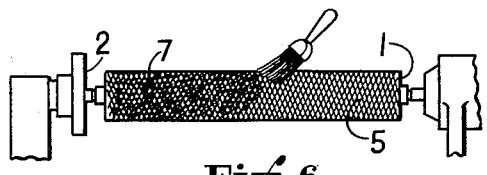
Figure 6 illustrates how a solvent may be applied to the outer surface of the partially completed article on the mandrel to ensure that a continuous smooth film or coating of resin is produced on the outermost surface of such article.

As indicated in Figure 6, the next step is to apply suitable diluent on the outer surface of the reinforced resin coating to eliminate any air bubbles formed during the winding operation and to produce a smooth outer surface. This diluent may be brushed on the rotating mandrel or applied in any other suitable manner. It reduces the viscosity, and possibly the surface tension, of the uncured resin. As previously indicated, I prefer to use a polyester resin for the coating and if this type of resin is employed, I prefer to use monomeric styrene as the thinner. I preferably use monomeric styrene although I may use diallyl phthalate or divinyl benzene in ethyl vinyl benzene. Not much of the thinned resin itself remains with the resin reinforcement built-up wall, but since monomeric styrene and the other diluents mentioned copolymerize with the resin, no special effort is required to remove this styrene-containing resin. In some cases, if a sufficiently thin resin is applied to the mandrel, no bubbles are formed at the surface of the built-up coating and it is not necessary to use a thinner for the resin.

This procedure will result in a non-porous built-up plastic wall of suitable thickness which has an outer continuous coating 7 of resin. For example, I have found that it is possible to make tubing in this manner in built-up wall thicknesses ranging from $\frac{1}{32}$ of an inch to $\frac{1}{4}$ inch. However, it is possible to make tubing of greater thicknesses.

Winding the reinforcement strand on the mandrel develops considerable pressure and, therefore, effectively forces the air outwardly through the resin coating. The mandrel, if hollow, should be of sufficient wall strength or be strengthened with a plug to resist this pressure. The viscosity of the resin depends somewhat upon the size of the mandrel and the speed at which it is rotated and the lead used in winding the strand on the mandrel, as previously indicated, is dependent somewhat upon the purpose for which the tubing is to be used. For example, a high pressure tubing would have the reinforcement essentially circumferentially while a low pressure tube, carrying a heavy liquid and supported only at long intervals, could have the reinforcement extending essentially longitudinally. I have used "angles of lead" of from one degree to sixty degrees with success.

Any suitable traversing mechanism may be used for applying the strand of reinforcement to the mandrel. In Figure 4, I have illustrated that the mandrel is rotated. However, it is possible to hold the mandrel stationary and to rotate a reinforcement-carrying head about the mandrel in order to wind the reinforcement thereon. This latter procedure would be desirable if the mandrel is a tube which it is desirable to heat internally by steam or other heating medium to cure or partially cure the resin as the reinforcement is being wound thereon or after it is completely wound thereon.

Figure 7:
Figure 7 is a view similar to Figure 5 but illustrating the condition of the partially completed article after the treatment indicated in Figure 6.

When the reinforced plastic wall has been built-up to the condition illustrated in Figure 7, it is necessary to thoroughly cure the resin of the wall. This may be accomplished in various ways, for example, as mentioned above, by internally heating the mandrel either during or after completion of the winding operation.

The build-up of resin and reinforcement may, if desired, be surfaced with a convolute winding of cellophane, and subsequently cured by the application of heat. Or, the resin may be cured with no protective covering if the mandrel is continuously rotated to counteract the tendency of the resin to flow downward during early stages of cure.

Figure 8:
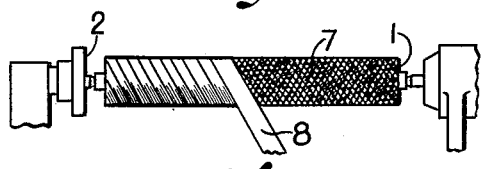
Figure 8 illustrates how a protecting covering in the form of a band helically wound on the outer surface of the article may be applied to such article preparatory to curing the article.
Figure 9:
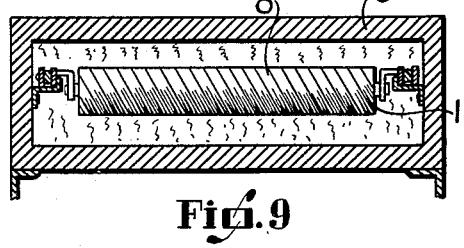
Figure 9 illustrates the curing operation.

In Figures 8 and 9, I have illustrated a strip 8 of cellophane or other suitable material helically wound on the partially completed tubing in overlapping convolutions. A slight tension on the cellophane strip will force the excess resin ahead of the strip as it is being wound on the mandrel, so that most of the excess resin will be removed from the mandrel. Instead of using cellophane strip or tape, any other suitable material can be employed since the purpose of the strip is to prevent gravitation of the resin during the curing operation. The mandrel wrapped in this manner may be positioned in an oven 9, as shown in Figure 9, where it may be subjected to a heating operation at a suitable temperature and for a suitable period of time to completely cure the resin. For example, if a polyester resin is used, I may employ a temperature of from 200° F. to 275° F. for periods ranging from 5 minutes to 1 hour.

Figure 11:
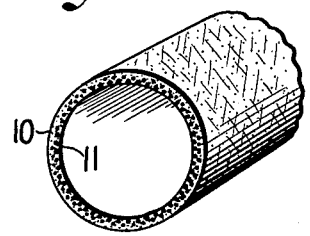
Figure 11 is a perspective view of a portion of the completed tubing.
Figure 10:
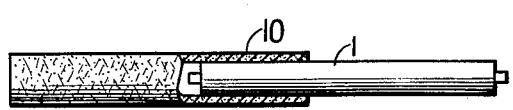
Figure 10 illustrates the completed cured article and indicates that the mandrel is removed therefrom.
Figure 12:
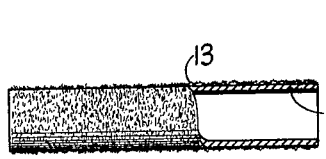
Figure 12 illustrates a mandrel in the form of a metal tube which is to serve as a liner for the completed tubing, the outer surface of the metal tube being roughened to cause the subsequently built-up wall structure to adhere thereto.
Figure 13:
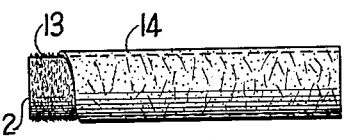
Figure 13 is an elevational view, partly broken away, showing the metal tube with the reinforced plastic covering.

As indicated in Figure 10, the cellophane strip is now removed from the article and the mandrel 1 may also be removed. The resulting tubing is illustrated in Figure 11. This tubing will consist of a body 10 of cured resin having reinforcement 11 embedded therein in the form of filaments which are spaced from each other in all directions and arranged in an interwoven pattern, as distinguished from definite layers which tend to separate.

Figure 14:
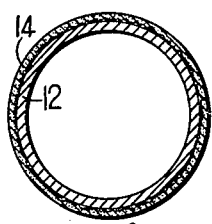
Figure 14 is an enlarged transverse section of the article shown in Figure 13.

As previously indicated, it may be desirable to retain the mandrel within the reinforced plastic tube in some instances. For example, it may be desirable to apply a built-up reinforced plastic wall as a covering to a metal tube 12 shown in Figure 12. In order to ensure that the built-up covering will adhere to the hollow mandrel or metal tube, the surface thereof is roughened suitably, as indicated at 13. Then the reinforced plastic covering 14 is formed in exactly the same manner as before. However, in this instance, the mandrel is not removed from the completed article but, in fact, forms a part of the completed article. Such article is illustrated in Figure 14 and will include the outer reinforced plastic covering 14, which is equivalent to the article of Figure 11, in covering relationship to the interior liner or metal tube 12.

Figure 15:
Figure 15 illustrates a completely formed tube of thermoplastic material adapted to serve as a liner for the subsequently built-up wall produced according to my invention.
Figure 16:
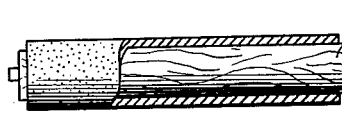
Figure 16 shows the tube of Figure 15 with a solid mandrel inserted therein to reinforce the plastic tube during subsequent operations.
Figure 17:
Figure 17 illustrates the tube of Figure 16 with a reinforced plastic covering thereon which has been built-up according to my invention and shows the mandrel being removed.
Figure 18:
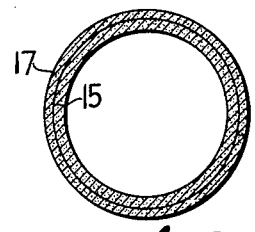
Figure 18 is an enlarged transverse sectional view through an article of the type shown in Figure 17.

It has been the custom to use thermoplastic tubing of various types for conducting certain chemicals due to the high chemical resistance of such material. They may also have electrical uses. However, this type of tubing does not have the necessary structural strength particularly at elevated temperatures. Such tubing can be reinforced according to my invention. For example, a tube 15 of thermoplastic resin, as shown in Figure 15, may receive a wood dowel or mandrel 16 to maintain its shape during the subsequent steps of my method. Then, as shown in Figures 17 and 18, a built-up reinforced plastic covering 17 is formed on the tube 15 in exactly the same manner as the covering 14 of Figure 14 is formed. As shown in Figure 17, the mandrel 16 is removed and the resulting article or tubing will consist of the inner liner 15 of a thermoplastic material reinforced by an outer built-up reinforced layer 17.

Figure 19:
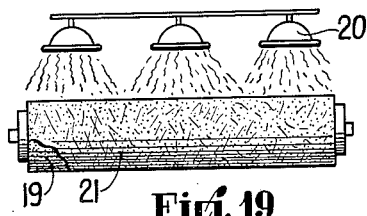
Figure 19 illustrates another method of forming a reinforced tube, the tube comprising a plastic liner bonded to an outer reinforced plastic wall structure built-up according to my invention.
Figure 20:
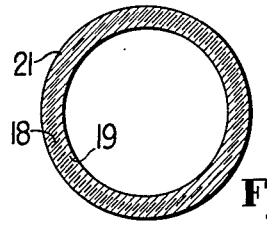
Figure 20 is an enlarged transverse sectional view through an article formed as illustrated in Figure 19.

In Figures 19 and 20, I have illustrated a somewhat similar process of forming reinforced plastic tubing with the exception that the two layers, similar to the layers 15 and 17 of Figure 18, are caused to chemically react with each other to produce a completely welded joint 18, as shown in Figure 20. To accomplish this, as shown in Figure 19, I start with a tube 19 which is formed by applying a coating of a suitable resin, such as a polyester resin, and then partially polymerize such resin by the use of infra-red heating lamps 20 or by any other suitable means. The polyester resin coating is jelled by heat from the lamps and at this time polymerization is substantially 15 to 20 per cent complete. A reinforced plastic covering 21 is then built-up in the manner previously described on the partially cured coating 19. The entire article is then subjected to heat from the infra-red lamps or other suitable means to completely polymerize the lining 19 and the covering 21 to integrally join such layers along the joint 18. Thus, the finished article, as shown in Figure 20, will consist of a lining 19 of a polyester resin and a covering 21 of reinforced polyester resin.

Figure 21:
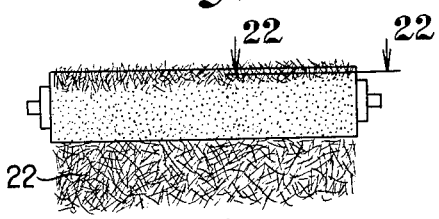
Figure 21 is a view showing how a reinforcing mat may be convolutely wound on a mandrel previously coated with the uncured resin.
Figure 22:
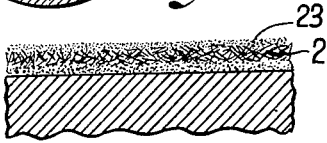
Figure 22 is a sectional view along line 22—22 of Figure 21 illustrating how the uncured resin coating on the mandrel is forced out through the mat.
Figure 23:
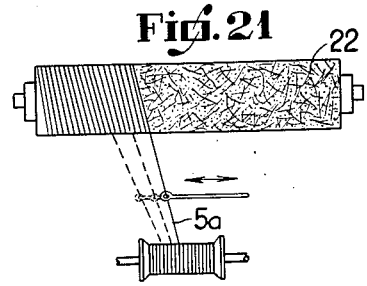
Figure 23 is a view illustrating how a strand of reinforcing may e wound on the mandrel with the covering built-up as in Figures 21 and 22.
Figure 24:
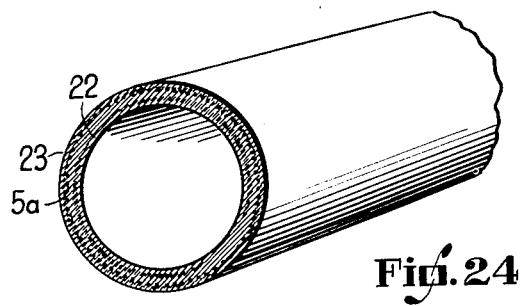
Figure 24 is a perspective view of a section of tubing produced according to Figures 21, 22 and 23.

In Figures 21 to 23, I illustrate another method of making reinforced plastic tubing according to my invention. In this instance, I use a different type of reinforcement. This reinforcement may be a loosely woven mat 22 of glass fibers. This mat may be formed of glass fibers bonded with a resin which provides little tensile strength. Consequently, I wind this mat convolutely on the mandrel which has been coated with resin in the manner previously described. As the mat is wound on the mandrel, the resin is forced outwardly through the fiber bundles and through the interstices thereof, forcing the air ahead of the resin so as to force any air bubbles to the surface of the resin coating. Additional resin may be added to the mandrel during the winding operation. As indicated in Figure 22, the mat will be embedded in the resin and will be completely covered by a coating 23 of the resin. The next step is to wind a strand 5a of suitable material over the resin embedded mat in the same manner as discussed with reference to Figure 4. The built-up tubing may then be treated by curing in the manner previously described and the article of Figure 24 will result. This article will consist of the filaments of the mat 22 and the overlying reinforcing 5a both of which are embedded in the resin material 23.

The mandrel-winding form of my method described above, will produce tubing with an extremely smooth inner surface which will be next to the mandrel during the formation thereof. The centrifugal form of my method, now to be described, will produce tubing with an extremely smooth outer surface.

I have made reinforced plastic tubing from polyester resin and glass fibers by placing the resin and a preform of glass fibers in a metal tube and rotating at moderately high speeds while heat is applied to the outer surface of the metal mold.

Success of this centrifugal operation hinges on the fact that the specific gravity of the reinforcement is higher than the specific gravity of the resin. Glass fiber has been used successfully. Wire would also meet the requirements.

A typical polyester resin in monomeric form has a specific gravity of 1.13. The same resin cured has a specific gravity of 1.22. Bulk glass of the composition used to make glass fibers has a specific gravity of 2.54. In fiber form it is believed that the specific gravity is somewhat lower, possibly as low as 2.4. For reinforcing plastics the individual filaments (diameter about 0.003 to 0.004") are not used alone, but rather as bundles. Some air is trapped between the individual filaments so that the bundles have an apparent specific gravity less than 2.4. The presence of twist in these bundles (i. e. yarn) reduces the voids between the filaments and increases the apparent specific gravity.

When the glass fibers are present as loose bundles, with a low apparent specific gravity, a pretreatment may sometimes be used to advantage to increase the apparent specific gravity to a usable value. Styrene is a liquid of low viscosity and low surface tension. It effectively enters these bundles of glass fibers, wetting out these glass rods, and by displacing the air in the fiber bundles increases the apparent specific gravity. The small quantity of styrene remaining with and in the fiber bundles is not harmful as it co-polymerizes with the polyester resin.

Angular velocities of 500 to 1,000 R. P. M. have been used with tubes of 3" diameter. Higher speeds would more effectively force the reinforcement out against the mold and would more effectively displace air near the outer surface of the reinforced plastic with resin. Higher angular velocities increase the necessity of proper distribution of resin and reinforcement to achieve the proper dynamic balance. At low speeds there is a tendency for the resin and reinforcement to roll in the tube. In some cases the reinforcement may actually roll up into balls. Obviously the reinforcement is not effective if it is rolled up into a series of balls or cylinders around the periphery of the tube. The fibers to be effective should be incorporated in the resin approximately parallel to the outer surface of the tube.

Minimum angular velocity is that above which this rolling does not occur. This appears to be about 100 to 300 R. P. M. for a 3" tube. Higher speeds would be used to more effectively force the reinforcement toward and to displace air near the outer surface with resin.

Because of the loose attachment between the mold and the resin and reinforcement, starting speeds somewhat slower than that attained with a direct drive are indicated, with 10 to 30 seconds being consumed in getting up to full speed.

This method provides a tube whose outer surface fairly well duplicates the inner surface of the mold, while variations in wall thickness show up as irregularities on the inner surface.

The reinforcement may be yarn, which may be preformed by winding on a mandrel with a suitable traverse mechanism to provide the desired angular fiber distribution and with a suitable build-up to provide the desired wall thickness. A temporary adhesive, such as is provided by using small quantities of butyl methacrylate in solvent, will provide sufficient strength to remove the preform from the mandrel and place it in the mold. The outside of the build-up is made slightly under the I. D. of the mold. As the preform rotates, the butyl methacrylate is softened by the polyester resin. The preform expands against the mold by reducing slightly the angularity of the yarn. For this expansion to occur in longer lengths, it is necessary in making the preform to traverse back and forth over a relatively short distance (say 6"), while moving the traversing mechanism along the length of the preforming mandrel (possibly several feet long.) If the build-up so requires, the traverse may be moved back and forth several times along the length of the preforming mandrel.

The reinforcement may be in the form of fabric. This, too, may be preformed by wrapping on a mandrel, and again small quantities of a temporary adhesive, such as butyl methacrylate, may be used to bind the preform for transferral to the mold. When the wall thickness is such that several layers of fabric are required, it is desirable to have several pieces of fabric, each piece being no longer than the length needed for one revolution plus a slight lap. This arrangement will allow a slightly undersize preform to expand in the mold.

Glass fiber mat may be wrapped on a mandrel or it may be placed directly inside the mold. Here again if several plies are required to provide the necessary wall thickness, each ply should be slightly longer than the length required for one revolution. Some of the mats have a low apparent specific gravity, and the necessary pretreating may be done in the mold by adding styrene and rotating. After pretreating, the excess styrene may be drained off through a tap in an end plug or cap. The speed may be resumed and the polyester resin added.

A cylindrical preform of glass fibers may be made with equipment similar to that used to preform rabbit fur for hats. Glass fibers, dispersed in air, would be drawn or allowed to settle down into a two-piece, perforated preforming mold. Suction outward through the perforated sides hold the fibers against the preforming mold. Distribution of the fibers along the perforated surface is influenced by the air flow through the screen at any point. This in turn, is influenced by the amount of perforation and by the build-up of fibers already accumulated. A temporary adhesive is added to facilitate transferral to the mold, where it is densified with styrene and handled much as the mat preforms.

The essentials for molding by this method are a tube and a mechanism for rotating it. One end may be capped or plugged completely, care being taken when a cap is used that there is no "overhang" or plastic between the cap and the end of the tube as much as "overhang" would complicate removal of the cured reinforced plastic part from the mold. The other end should be partially open, preferably an annular cap which seals the outer area of the tube. After the reinforcement is placed in the mold, the cap is placed on the remaining open end, and with the assembly rotating, resin is added through a hole in the cap.

Figure 25:
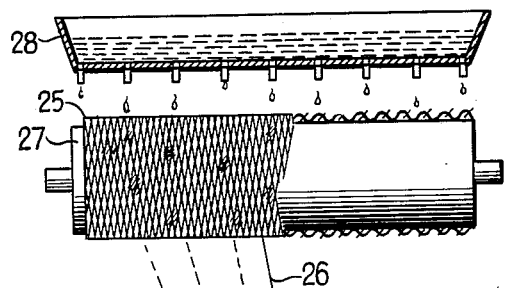
Figure 25 illustrates how a preform of reinforcement may be formed for use in the centrifugal form of my method of producing the tubing.
Figure 26:
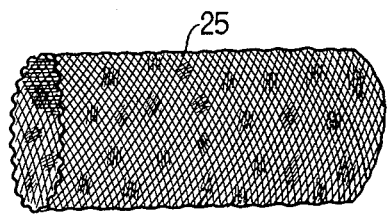
Figure 26 is a perspective view of the preform.
Figure 27:
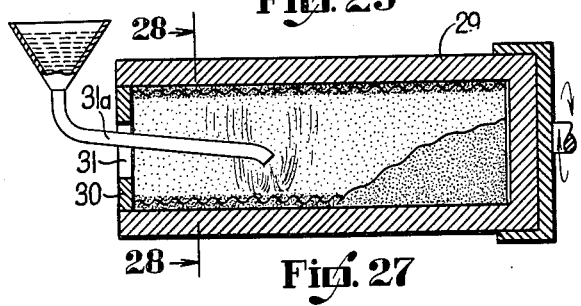
Figure 27 illustrates the preform in the mold with resin being supplied to the interior thereof.

In Figure 25, I illustrate one way in which a preform may be produced for use in the centrifugal form of my method. The preform 25 (Figure 26) may be of tubular or other form and may be produced by winding the strand 26 on a mandrel 27 and at the same time dropping a small amount of temporary adhesive thereon from a trough 28. The preform 25 will then be placed in the mold 29 which is shown in Figure 27. One end of this mold will be closed by a removable cap 30 which has a central inlet opening 31. Resin will be supplied to the interior of the mold through a tube 31a extending inwardly through the opening 31.

Figure 28:
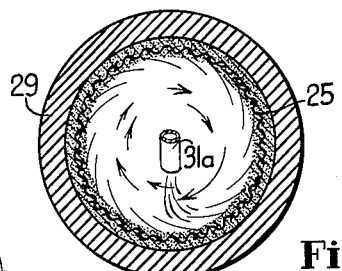
Figure 28 is a transverse sectional view taken along line 28—28 of Figure 27.
Figure 29:
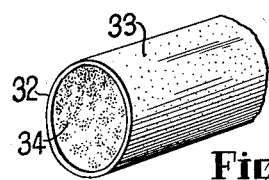
Figure 29 is a perspective view of a portion of the article which has been produced by the centrifugal method.

The preform 25 is placed in the mold 29 and the mold is rotated at the same time that resin is supplied thereto. The resin will be forced out through the preform, as shown in Figure 28, and the air will be forced inwardly and be eliminated. When the wall has been built-up to the desired extent, the tube 32 may be removed from the mold and will appear as in Figure 29, having an extremely smooth outer surface 33 and a relatively smooth inner surface 34 at which surface the air is eliminated.

Figure 30:
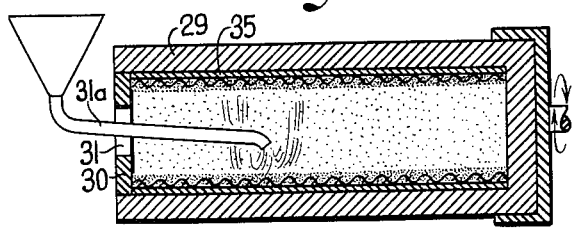
Figure 30 is a view similar to Figure 27 but illustrating how the built-up plastic tubing may be provided with a previously formed tubular cover.

Sometimes it is desirable to reinforce the built-up tubing with a previously formed tubular cover. For example, as shown in Figure 30, a metal tube 35 may first be placed in the mold and then the preform will be inserted in the tube 35. The tube 35 preferably will have a rough inner surface and the built-up tube will adhere thereto.

Figure 31:
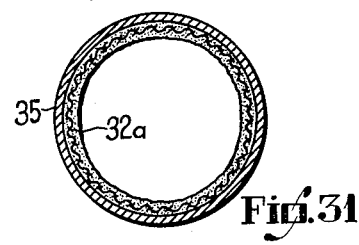
Figure 31 is an end view illustrating the article produced according to Figure 30 with a metal cover.

The resulting article, as shown in Figure 31, will comprise the outer metal cover 35 and the inner built-up tube 32a.

Figure 32:
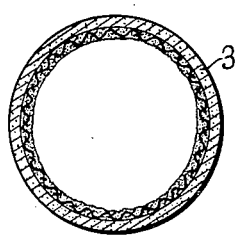
Figure 32 is a similar view but showing the article with a plastic cover.
Figure 33:
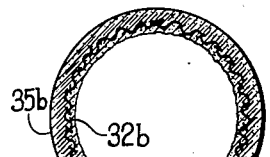
Figure 33 is a similar view but showing the article with a different arrangement of plastic cover.

Instead of the cover being metal, it may be a previously formed tube 35a of thermoplastic resin as shown in Figure 32, similar to tube 15 of Figure 18. Or it may be a partially polymerized resin tube 35b, shown in Figure 33, which is chemically bonded to the built-up tube 32b. The tube 35b will be like the tubular liner 19 of Figure 20.

It will be apparent from the above description that I have provided a reinforced hollow plastic article having a number of advantages. The reinforcement is in the form of filaments embedded in the plastic material and spaced from each other in all directions. The filaments are not exposed at either surface of the wall of the article but each of said surfaces is a continuous smooth coating of plastic. The article is so formed that it is non-porous and of high structural strength. The method which I provide for making this article is very simple and is of such a nature that the reinforcement is combined with the resin without trapping air in the built-up wall. Furthermore, the method is such that the filament is incorporated with the resin in the built-up wall structure in the form of an interweaving pattern or mat of random fiber orientation which eliminates layer orientation.

Various other advantages will be apparent from the preceding description, the drawings and the following claims.

Having thus described my invention, what I claim is:

1. The method of forming a hollow plastic article comprising coating a support with an uncured resin in flowable condition, applying reinforcement in the form of filaments to the coated support and spacing the filaments from each other sufficiently so that as they are applied to the support the resin of the coating will seep out through the spaces between the filaments and force the air ahead of it, and then curing the resin of the article so formed.

2. The method of claim 1 which includes coating the support with the uncured resin in sufficient amount to form a continuous coating of resin on the outer surface of the article to completely cover said filaments.

3. The method of forming tubing which comprises coating a mandrel with an uncured resin which is in flowable condition, winding reinforcement in the form of filaments on the coated mandrel and spacing the filaments from each other sufficiently so that as the reinforcement is wound on the mandrel the resin of the coating will seep out through the spaces between the filaments and force the air ahead of it, and then curing the resin of the tube so formed.

4. The method of claim 3 which includes coating the mandrel with the uncured resin in sufficient amount to form a continuous coating of resin on the outer surface of the tubing to completely cover said filaments.

5. A method according to claim 4 wherein the tubing is wrapped with a covering before being cured.

6. A method according to claim 3 wherein the mandrel is removed after the curing operation.

7. A method according to claim 3 wherein the mandrel is in the form of a metal tube upon which the tubing is formed and which remains within the tubing as a reinforcement therefor.

8. A method according to claim 3 wherein a tube of thermoplastic material is first applied to the mandrel and then the tubing is formed thereon.

9. A method according to claim 3 wherein a tube of thermoplastic material is applied to the mandrel and is partially polymerized and then the tubing is built-up on the mandrel, the partially polymerized tube and the built-up tubing then being completely polymerized during the curing operation to form a unitary structure.

10. A method according to claim 3 wherein the reinforcement is in the form of a strand helically wound on the mandrel with a sufficient lead to space the convolutions thereof.

11. A method according to claim 3 wherein the reinforcement is applied as a mat of spaced fibers and then as a strand which is wound around the resin-embedded mat with a sufficient lead to space the convolutions thereof.

RICHARD J. FRANCIS.

REFERENCES CITED

The following references are of record in the file of this patent:

UNITED STATES PATENTS

| Number | Name | Date |
| --- | --- | --- |
| 1,161,756 | Wolever | Nov. 23, 1915 |
| 1,302,744 | Whitford | May 6, 1919 |
| 1,304,694 | Marquette | May 27, 1919 |
| 1,310,715 | Rose et al. | July 22, 1919 |
| 1,458,931 | Frederick | June 19, 1923 |
| 1,668,763 | Dickson | May 8, 1928 |
| 2,029,048 | Atwood | Jan. 1, 1936 |
| 2,255,887 | Katz | Sept. 16, 1941 |
| 2,260,282 | Grint | Oct. 28, 1941 |
| 2,265,226 | Clewell et al. | Dec. 9, 1941 |
| 2,349,549 | Hardman et al. | May 23, 1944 |
| 2,389,725 | Gillis et al. | Nov. 27, 1945 |
| 2,455,362 | Garrett | Dec. 7, 1948 |
| 2,467,999 | Stephens | Apr. 19, 1949 |
| 2,470,599 | Billmeyer | May 17, 1949 |
| 2,552,599 | Stout | May 15, 1951 |